(12) United States Patent
Zehe

(10) Patent No.: US 11,946,700 B2
(45) Date of Patent: Apr. 2, 2024

(54) HEAT STORAGE SYSTEM AND METHOD FOR STORING AND EXTRACTING HEAT

(71) Applicant: ROWE Holding GmbH, Worms (DE)

(72) Inventor: Michael Zehe, Flörsheim-Dalsheim (DE)

(73) Assignee: Rowe Holding GmbH, Worms (DE)

( * ) Notice: Subject to any disclaimer, the term of this patent is extended or adjusted under 35 U.S.C. 154(b) by 40 days.

(21) Appl. No.: 17/672,839

(22) Filed: Feb. 16, 2022

(65) Prior Publication Data

US 2023/0258413 A1    Aug. 17, 2023

(51) Int. Cl.
*F28D 20/00* (2006.01)

(52) U.S. Cl.
CPC ................ *F28D 20/0056* (2013.01)

(58) Field of Classification Search
CPC . F24H 7/0233; F24H 7/0216; B60H 1/00557; B60H 1/00314; B60H 1/00507; F28D 20/023; F28D 15/02; F28D 9/0037; F24D 2220/10; C09K 5/063; F28F 23/00; Y02E 60/14
See application file for complete search history.

(56) References Cited

U.S. PATENT DOCUMENTS

| | | | | |
|---|---|---|---|---|
| 5,379,832 A * | 1/1995 | Dempsey | ................ | F25B 39/00 165/110 |
| 5,944,089 A * | 8/1999 | Roland | ................ | F28D 1/0475 165/145 |
| 9,873,305 B2 * | 1/2018 | Bank | ...................... | F24H 7/0216 |
| 10,644,215 B2 * | 5/2020 | Nakanuma | ............. | H10N 10/10 |
| 2012/0037148 A1 * | 2/2012 | Tudor | ..................... | F28D 20/02 126/400 |
| 2012/0067551 A1 * | 3/2012 | Ganapathi | ................ | C09K 5/04 165/104.21 |
| 2012/0152511 A1 * | 6/2012 | Chang | ................ | B60H 1/00478 165/10 |
| 2014/0238634 A1 * | 8/2014 | Ronnebro | ............. | F28D 20/003 165/10 |
| 2017/0010219 A1 * | 1/2017 | Almog | ............... | G01N 21/8806 |
| 2017/0276435 A1 * | 9/2017 | Papadopoulos | ........... | F01K 3/00 |

FOREIGN PATENT DOCUMENTS

GB          2506354 A      4/2014

OTHER PUBLICATIONS

European Search Report for Application No. EP21000351 dated May 6, 2022, 1-page.

* cited by examiner

*Primary Examiner* — Shafiq Mian
(74) *Attorney, Agent, or Firm* — Warn Partners, P.C.

(57) ABSTRACT

The present invention relates to a heat storage system (2) comprising a storage space (20), a heat storage medium in the storage space (20), and an extraction device (26) for extracting heat from the heat storage medium, the extraction device (26) comprising a first solid body arrangement (28) contacting the heat storage medium. The extraction device (26) further comprises a second solid body arrangement (30), wherein a solid body contact between the first solid body arrangement (28) and the second solid body arrangement (30) can be modified by increasing or decreasing a heat flow from the first solid body arrangement (28) to the second solid body arrangement (30). The present invention further relates to a method for storing and extracting heat.

11 Claims, 6 Drawing Sheets

HEAT STORAGE SYSTEM AND METHOD FOR STORING AND EXTRACTING HEAT

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The present invention relates to a heat storage system comprising a storage space, a heat storage medium in the storage space, and an extraction device for extracting heat from the heat storage medium, the extraction device comprising a first solid body arrangement contacting the heat storage medium. The present invention further relates to a method for storing and extracting heat, particularly for storing and extracting heat in a corresponding heat storage system.

Description of Related Art Including Information Disclosed Under 37 CFR 1.97 and 1.98

EP 3 635 317 B1 describes a latent heat storage system and a method for operating the same. The known latent heat storage system comprises a storage space in the form of a latent heat reservoir, a storage medium having latent heat being present in the storage space. In order to be able to extract the heat from the storage medium within the storage space, a line leads from the outside to a heat exchanger within the storage space, while a further line leads back out of the storage space from the heat exchanger, a feed pump being provided for feeding a heat transfer medium through the two lines and the heat exchanger. The heat exchanger thereby forms a solid body arrangement contacting the storage medium within the storage space, so that the heat of the storage medium can be emitted to the heat transfer medium flowing through the heat exchanger by means of the solid body arrangement of the heat exchanger, said medium being able to be fed subsequently to a consumer or the like by means of the line leading out of the storage space.

The known latent heat storage system is established, but has a relatively complex structure and leads to increased maintenance effort. The heat flow between the heat storage medium on one side and the consumer on the other side can be controlled or regulated only to a limited degree or with great effort by means of the speed of the feed pump for the heat transfer medium.

BRIEF SUMMARY OF THE INVENTION

One object of the present invention is thus to refine a heat storage system, particularly a latent heat storage system, such that said system comprises a relatively simple and low-maintenance structure and simple control or regulation of the heat flow from the storage medium to a consumer. A further object of the present invention is to disclose a particularly simple method for storing and extracting heat, particularly a suitable method for operating the heat storage system according to the invention.

The object is achieved by the features disclosed in claims 1 and 12. Advantageous embodiments of the invention are the subject-matter of the subclaims.

The heat storage system according to the invention comprises a storage space. The storage space is preferably closed in design, without being incorporated in a circuit. A heat storage medium is received in the storage space of the heat storage system. The heat storage medium is preferably a latent heat storage medium or a phase-changing material, such as a salt or salt mixture, so that the heat storage system is particularly preferably implemented as a molten salt storage system. The heat storage system further comprises a heating device for heating the heat storage medium.

The heat storage system further comprises an extraction device for extracting heat from the heat storage medium within the storage space. The extraction device comprises a first solid body arrangement contacting the heat storage medium within the storage space, so that heat can be transferred from the heat storage medium to the first solid body arrangement. The first solid body arrangement can be made of one single solid body or of at least two solid bodies connected to each other. In the case of at least two solid bodies connected to each other, said bodies are preferably connected to each other such that heat transfer can occur between all solid bodies by means of solid body contact. For a first solid body arrangement made of at least two solid bodies, it is also possible that only one of the solid bodies contacts the heat storage medium. While the heat storage system according to EP 3 635 317 B1 provides for only one first solid body arrangement in the form of a heat exchanger comprising inlet and outlet lines present within the storage space and interacting directly with a heat transfer medium flowing in the heat exchanger, the extraction device for the heat storage system according to the invention further comprises a second solid body arrangement. The second solid body arrangement can also be implemented by a single solid body or at least two solid bodies connected to each other, the solid bodies for at least two solid bodies connected to each other preferably being connected to each other such that heat transfer can occur between all solid bodies by means of solid body contact between said solid bodies. In order to be able to adjust, regulate, or control in a particularly simple and low-maintenance manner a heat flow between the first solid body arrangement and the second solid body arrangement, from which the heat can be ultimately fed to a consumer, the first and second solid body arrangements interact such that a solid body contact between the first solid body arrangement and the second solid body arrangement can be modified by increasing or decreasing a heat flow from the first solid body arrangement to the second solid body arrangement. Consequently, an amount of heat able to be transferred per unit of time can be increased or decreased by modifying the solid body contact. In the heat storage system according to the invention, the extraction device is implemented such that the solid body contact between the first solid body arrangement and the second solid body arrangement can be or is established indirectly. Indirectly establishing the solid body contact is hereby understood to be interposing one or more solid bodies having both solid body contact with the first solid body arrangement and solid body contact with the second solid body arrangement. Only a fairly simple mechanism is necessary for modifying the solid body contact between the first solid body arrangement and the second solid body arrangement and thus for modifying the heat flow starting from the heat storage medium through first solid body arrangement to the second solid body arrangement, without a high-maintenance heat exchanger having an internally flowing heat transfer medium being necessary.

In an advantageous embodiment of the heat storage system according to the invention, the extraction device is implemented such that the solid body contact between the first solid body arrangement and the second solid body arrangement can be modified in a stepwise or incremental manner. Said embodiment is particularly advantageous if continuously modifying the solid body contact is not necessary for a particular application. Alternatively, however, the extraction device can also be implemented such that the solid body contact between the first solid body arrangement and the second solid body arrangement can be modified continuously.

In a further advantageous embodiment of the heat storage system according to the invention, the extraction device is implemented such that the solid body contact between the first solid body arrangement and the second solid body arrangement can be eliminated and established. The solid body contact can be eliminated for said embodiment in an analogous manner in order to reduce the heat flow as far as possible. If, however, increased heat flow is required, then the solid body contact between the first and the second solid body arrangements can be established by the extraction device.

In a particularly advantageous embodiment of the heat storage system according to the invention, the extraction device is implemented such that the solid body contact between the first solid body arrangement and the second solid body arrangement can be modified by modifying a quantity of solid bodies making contact with both the first and the second solid body arrangement. Said embodiment is preferred in this respect in that the first and second solid body arrangements do not fundamentally need to be displaced relative to each other, but rather only the intermediary solid bodies need to be placed in a position in which said bodies make contact with both the first and the second solid body arrangement, or do not. In the simplest case, only one intermediary solid body would be necessary here, wherein a plurality of intermediary solid bodies are then preferred if heat flows of different magnitudes are to be obtained or set between the first solid body arrangement and the second solid body arrangement.

In a further particularly advantageous embodiment of the heat storage system according to the invention, the first solid body arrangement and the second solid body arrangement each comprise at least one surface by means of which the solid body contact can be or is established indirectly in order to achieve the heat flow from the first solid body arrangement to the second solid body arrangement. In order to prevent heat loss due to convection at the surface of the first solid body arrangement, both the surface of the first solid body arrangement and the surface of the second solid body arrangement are disposed in a closed or/and evacuated contact space. Particularly for an evacuated contact space, the vacuum within the contact space prevents convection.

In a preferred embodiment of the heat storage system according to the invention, a third solid body arrangement comprising at least one displaceable solid body is provided. Like the first and second solid body arrangements, the third solid body arrangement can also be formed by only one displaceable solid body, or by at least two displaceable solid bodies. In contrast to the first and second solid body arrangements, a connection between the at least two displaceable solid bodies such that a heat flow can be established between said bodies solely due to a solid body contact is not preferred or necessary. The at least one displaceable solid body can be displaced relative to the first and second solid body arrangement from a first position, in which the displaceable solid body does not contact any of the surfaces or contacts the surface of only one of the first and second solid body arrangements, into a second position, in which the displaceable solid body contacts the surfaces of the first and second solid body arrangements. A drive device for displacing the at least one displaceable solid body is preferably provided, wherein the drive device particularly preferably comprises a drive motor, for example an electric motor. In order to produce a particularly simple mechanism, the at least one displaceable solid body is preferably displaceable translationally from the first into the second position and vice versa. In a simplest embodiment variant, only one displaceable solid body can be provided in order to eliminate the indirect solid body contact in the first position and to establish said contact in the second position. As previously indicated, however, in the present embodiment it is preferable if the third solid body arrangement comprises at least two displaceable solid bodies for displacing independently of each other into the first and/or second position in order to be able to regulate the heat flow from the first solid body arrangement to the second solid body arrangement in three or more increments.

In a further advantageous embodiment of the heat storage system according to the invention, the at least one displaceable solid body of the third solid body arrangement is disposed in the closed or/and evacuated contact space in order to make or maintain contact with the surfaces of the first solid body arrangement and the second solid body arrangement.

In order to simplify the heat storage system, particularly the extraction device of the heat storage system, the first solid body arrangement and the second solid body arrangement are disposed immovably relative to each other in a further preferred embodiment of the heat storage system according to the invention, especially as a relative motion between the first and second solid body arrangements is unnecessary thanks to the third solid body arrangement and the at least one displaceable solid body thereof. Alternatively or in addition, the surfaces of the first and second solid body arrangement are permanently spaced apart from each other without said bodies directly making contact with each other.

In a further particularly preferred embodiment of the heat storage system according to the invention, the surface of the first solid body arrangement comprises at least one first surface segment and the surface of the second solid body arrangement comprises at least one second surface segment associated with each other and set at an angle to each other, while the displaceable solid body of the third solid body arrangement is wedge shaped, such that said body flatly contacts the first and second surface segments of the first and second solid body arrangements. Because of the inclined orientation of the first and second surface segments to each other, and because of the wedge shape of the displaceable solid body of the third solid body arrangement, a short displacement of the displaceable solid body from the first position to the second position can establish a large surface area contact with both the first solid body arrangement and the second solid body arrangement in order to increase the heat flow between the first solid body arrangement and the second solid body arrangement. For the present embodiment, it is preferable if the surface segments associated with each other, namely the first surface segment and the associated second surface segment, enclose an angle of less than 60° or less than 10°. It is further preferable if the surface of the first or/and the second solid body arrangement is shaped in the manner of a lateral surface of a pyramid or of a frustrum of a pyramid. A corresponding pyramid or frustrum of a pyramid can thus comprise three, four, or more sides and a corresponding quantity of associated displaceable solid bodies of the third solid body arrangement in order to be able to achieve a corresponding gradation of the solid body contact and the heat flow between the first and second solid body arrangements.

In a further particularly advantageous embodiment of the heat storage system according to the invention, the first solid body arrangement comprises an outlet-side solid body for achieving the direct or indirect solid body contact with the second solid body arrangement. The first solid body arrangement further comprises at least one strut protruding into the storage space for contacting the storage medium. It is thereby preferable if the at least one strut directly contacts the outlet-side solid body comprising the previously mentioned surface, for example. It is further preferable if at least two such struts protruding into the storage space are provided, wherein the struts are preferably disposed symmetrically relative to the storage space or the shape thereof. In order to simplify the heat transfer from the storage medium to the strut of the first solid body arrangement, the surface area of the strut protruding into the storage space is increased in that protruding ribs or fins are disposed on or attached to the strut. It has thereby been found to be advantageous if the ribs or fins are each formed by a multiply curved, elongated element, optionally in a plane.

In a further preferred embodiment of the heat storage system according to the invention, the second solid body arrangement comprises a solid body for implementing the inner side of a fluid container or a fluid line for heating a fluid. In this manner, the heat can depart the extraction device of the heat storage system and be transferred via the inner side, for example a floor, of a fluid container or a fluid line to the fluid within the fluid container or the fluid line, in order to then be able to be consumed after storing the heat in the heat storage medium of the storage space. This can thus also be referred to as an outlet-side solid body of the second solid body arrangement. The solid body thereby preferably forms the inner side of the boiler of an evaporator, so that the fluid evaporated in the boiler can preferably drive a turbine or the like as vapor under pressure.

In a further advantageous embodiment of the heat storage system according to the invention, the heating device for heating the heat storage medium is an inductive heating device able to convert a current, particularly a high-frequency alternating current, into heat energy via induction, making the heat storage system particularly interesting for storing regeneratively produced electrical power. For the present embodiment, it is preferable if the heating device comprises at least one heatable heating strut extending into the storage space. As previously for the strut of the first solid body arrangement extending into the storage space, it is also preferable for the heating strut if protruding ribs or fins are disposed on or attached to the same, also preferably formed by a multiply curved, elongated element, optionally in one plane, in order to increase the surface area of the heating device interacting with and contacting the heat storage medium. It is further preferable for the present embodiment if at least two heating struts are provided, wherein the heating struts are preferably disposed symmetrically relative to the cross section of the storage space. It has further been found that it is advantageous if the struts of the first solid body arrangement and the heating struts of the heating device extend into the storage space in opposite directions or elevations of the heat storage system, wherein in the present context it has also been found to be advantageous if the struts or heating struts extending into the storage space do not contact the opposite boundaries of the storage space, but rather particularly preferably comprise exposed ends.

In order to prevent loss of energy or heat in the region of the heating device, in a further preferred embodiment of the heat storage system according to the invention the at least one heating strut of the heating device extends out of the storage space into a closed or/and evacuated induction space in which the heating strut interacts with an inductor, preferably a coil, for heating the heating strut. Because of the arrangement of the heating strut and the inductor in the closed or/and evacuated induction space, heat losses due to convection are largely or entirely prevented.

In a further advantageous embodiment of the heat storage system according to the invention, the heat storage system is implemented as a latent heat storage system having a phase change material as the heat storage medium. Because of the phase change material used, the heat storage medium can store large amounts of heat in a small temperature range about a phase change, preferably occurring between a solid and liquid. It is thereby preferable if the phase change material is a salt or a mixture of salts. For the present embodiment it is therefore particularly preferable if the storage space and the heat storage medium present therein forms a molten salt heat store.

As previously explained, the first solid body arrangement or/and the second solid body arrangement or/and the third solid body arrangement is implemented by one or more solid bodies in a further preferred embodiment of the heat storage system according to the invention, said solid bodies being made of or manufactured of metal or a metal alloy in order to achieve particularly high heat flow between the first solid body arrangement and the second solid body arrangement for solid body contact. Nonferrous metals such as copper or copper alloys are particularly preferable here.

Because solid body contact between the first solid body arrangement and the second solid body arrangement beyond the previously described modifiable solid body contact can hardly be avoided in the sense of a compact structure of the heat storage system, in a further advantageous embodiment of the heat storage system according to the invention a permanent solid body contact is present between the first and second solid body arrangement by means of at least one further component of the heat storage system, wherein the at least one further component of the heat storage system is preferably implemented as an insulator or/and has a lower thermal conductivity than the at least one solid body of the first and second solid body arrangements. For this purpose, the at least one further component is preferably not made of metal.

The method according to the invention serves for storing and extracting heat while achieving the advantages indicated above with reference to the heat storage system. It is thereby preferable if the method serves for operating a heat storage system of the type according to the invention. The method comprises the method steps of providing a heat storage medium contacting a first solid body arrangement a heating device for heating the heat storage medium and a second solid body arrangement, heating the heat storage medium by said heating device, modifying a solid body contact between the first solid body arrangement and the second solid body arrangement while increasing or decreasing a heat flow from the first solid body arrangement to the second solid body arrangement, and extracting heat from the second solid body arrangement.

In a preferred embodiment of the method according to the invention, the solid body contact between the first solid body arrangement and the second solid body arrangement is modified incrementally or continuously.

According to a further preferred embodiment of the method according to the invention, the solid body contact between the first solid body arrangement and the second solid body arrangement is eliminated and established.

According to a further preferred embodiment of the method according to the invention, the solid body contact between the first solid body arrangement and the second solid body arrangement is established indirectly.

In a particularly advantageous embodiment of the method according to the invention, the solid body contact between the first solid body arrangement and the second solid body arrangement can be modified by modifying a quantity of solid bodies making contact with both the first and the second solid body arrangement.

In a particularly advantageous embodiment of the method according to the invention, the extracting of heat from the second solid body arrangement takes place by heating a fluid contacting the second solid body arrangement.

In a particularly preferred embodiment of the method according to the invention, the solid body contact is modified by means of a drive device, preferably an electric and/or hydraulic drive device.

With respect to the advantages of the embodiments of the method according to the invention and further embodiments of the same, reference is made to the preceding description of the heat storage system according to the invention, from which the corresponding advantages and embodiments of the method according to the invention are obvious by implication to the person skilled in the art, without the corresponding features needing to be repeated here.

BRIEF DESCRIPTION OF THE SEVERAL VIEWS OF THE DRAWINGS

The invention is explained in greater detail below, using example embodiments with reference to the attached drawings. Shown are.

DETAILED DESCRIPTION OF THE INVENTION

Figure 1:
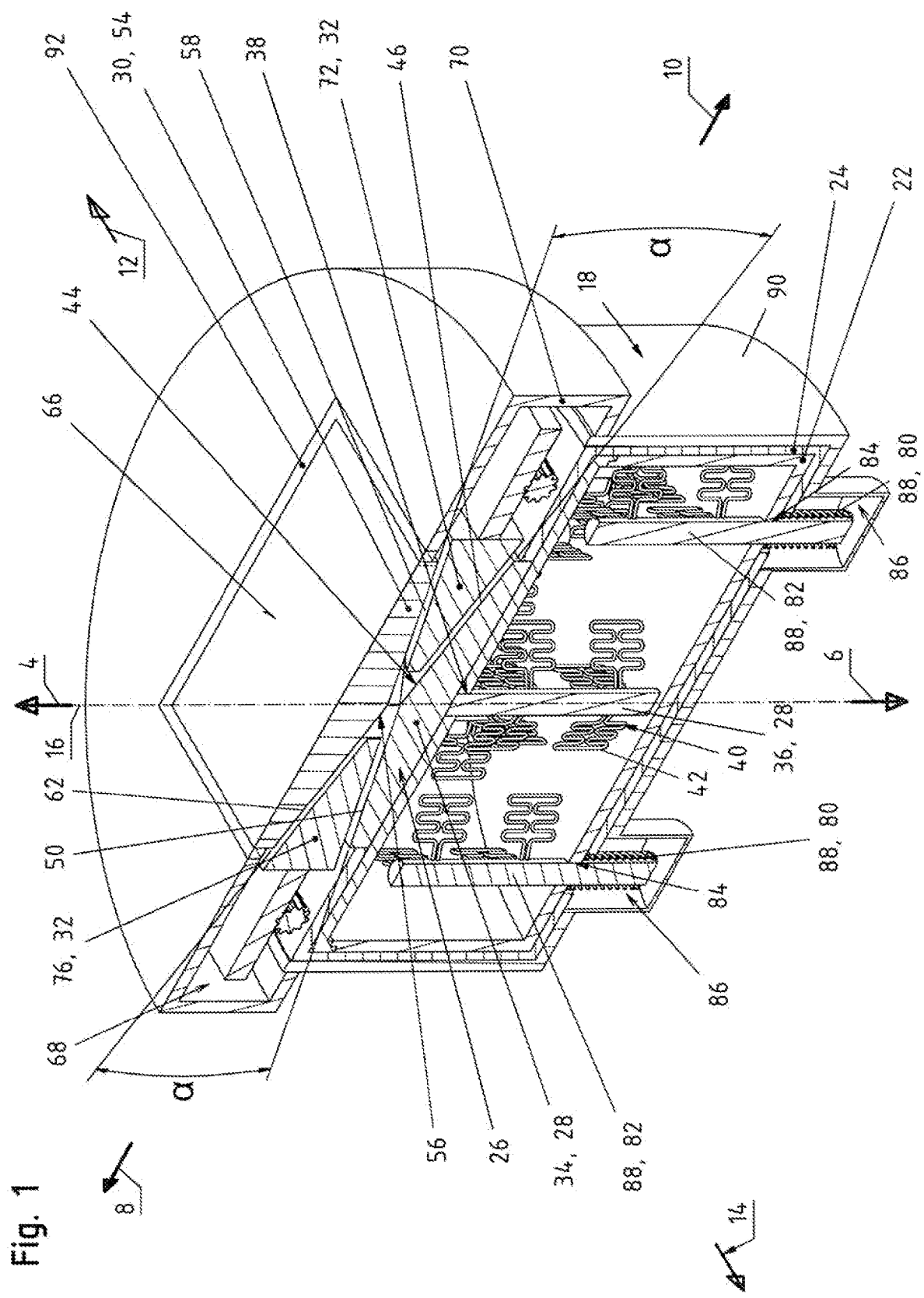
FIG. 1 a perspective section view of an embodiment of the heat storage system according to the invention, FIG. 2 a partial exploded view of the heat storage system from FIG. 1, FIG. 3 a plan section view of the storage space of the heat storage system from FIGS. 1 and 2, FIG. 4 a partial magnified view of a strut or heating strut from the perspective view of FIG. 1 through 3, FIG. 5 a side section view of the heat storage system from FIG. 1 through 3 having the displaceable solid bodies in a first position, and FIG. 6 the cross-section view from FIG. 5 having the displaceable solid bodies in a second position.
Figure 2:
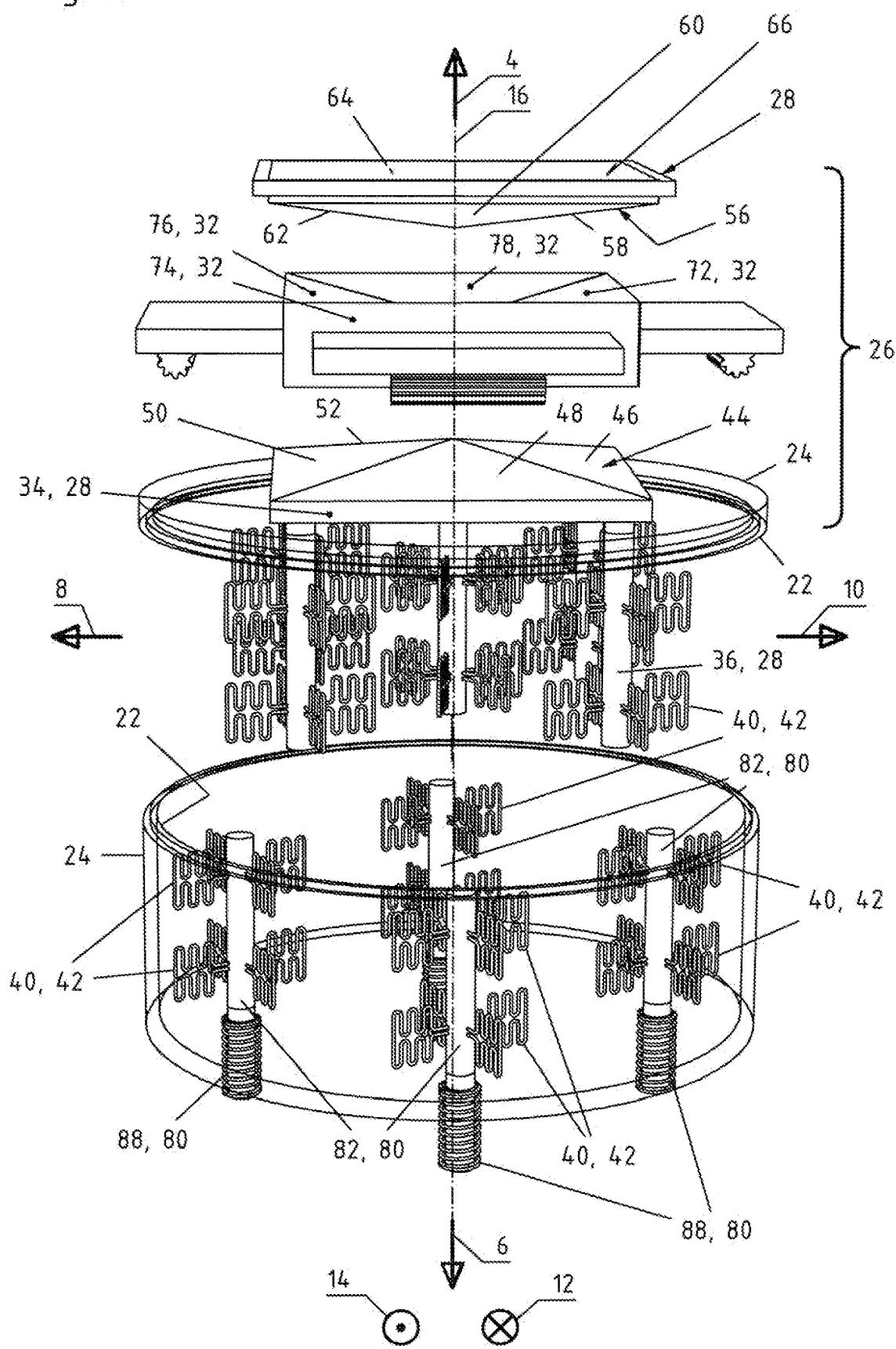

FIG. 1 through 6 show an embodiment of the heat storage system according to the invention for performing the method according to the invention for storing and extracting heat. The mutually opposite height directions 4, 6, the mutually opposite width direction 8, 10, and the mutually opposite length directions 12, 14 of the heat storage system 2 are indicated by means of corresponding arrows, wherein the heat storage system 2 comprises a central height axis 16 extending in the height directions 4, 6.

The heat storage system 2 comprises a housing 18 comprising a plurality of housing parts or segments. A storage space 20 is implemented within the housing 18. The storage space 20 is substantially cylindrical in design, wherein the longitudinal axis thereof extends in the height direction 4, 6 and is preferably identical to the height axis 16 of the housing 18. The storage space 20 is closed off by the housing 18. The storage space 20 is thus not integrated in any circuit and inflows or/and outflows are preferably not provided. The storage space serves for receiving a heat storage medium, wherein the heat storage medium within the storage space 20 is not depicted in the figures for reasons of clarity. The storage space 20, although not shown, is preferably filled to at least 95% or completely with the heat storage medium. The storage space 20 is bounded by an inner housing part 22 and an outer housing part 24 enclosing the inner housing part of the housing 18, wherein the inner or/and outer housing part 22 or 24 can in turn be implemented having one, two, or more parts and can analogously implement a storage space housing 22, 24.

An extraction device 26 for extracting heat out of the heat storage medium is disposed above the storage space in the height direction 4 and outside of the at least one inner housing part 22. The extraction device 26 comprises a first solid body arrangement 28, a second solid body arrangement 30, and a third solid body arrangement 32, all described in greater detail below.

The first solid body arrangement 28 contacts the heat storage medium within the storage space 20. The first solid body arrangement 28 comprises a solid body 34 at the outlet side for achieving the solid body contact with the second solid body arrangement 30 as described in more detail below. The outlet-side solid body 34 extends substantially in the width and length directions 8 through 14 and the side thereof facing downward in the height direction 6 is disposed on the side of the inner housing part 22 facing upward, or optionally that of the outer housing part 24. The first solid body arrangement 28 further comprises further solid bodies, namely a plurality of struts 36 protruding downward in the height direction 6 into the storage space 20 for contacting the storage medium within the storage space 20. The ends of the struts 36 facing upward in the height direction 4 are directly connected to the outlet-side solid body 34 of the first solid body arrangement 28, while the end of the strut 36 facing downward in the height direction 6 is spaced apart from the inner housing part 22. In order to reach into the storage space 20 from the outlet-side solid body 34, the struts 36 extend through corresponding openings 38 in the inner housing part 22.

Figure 3:
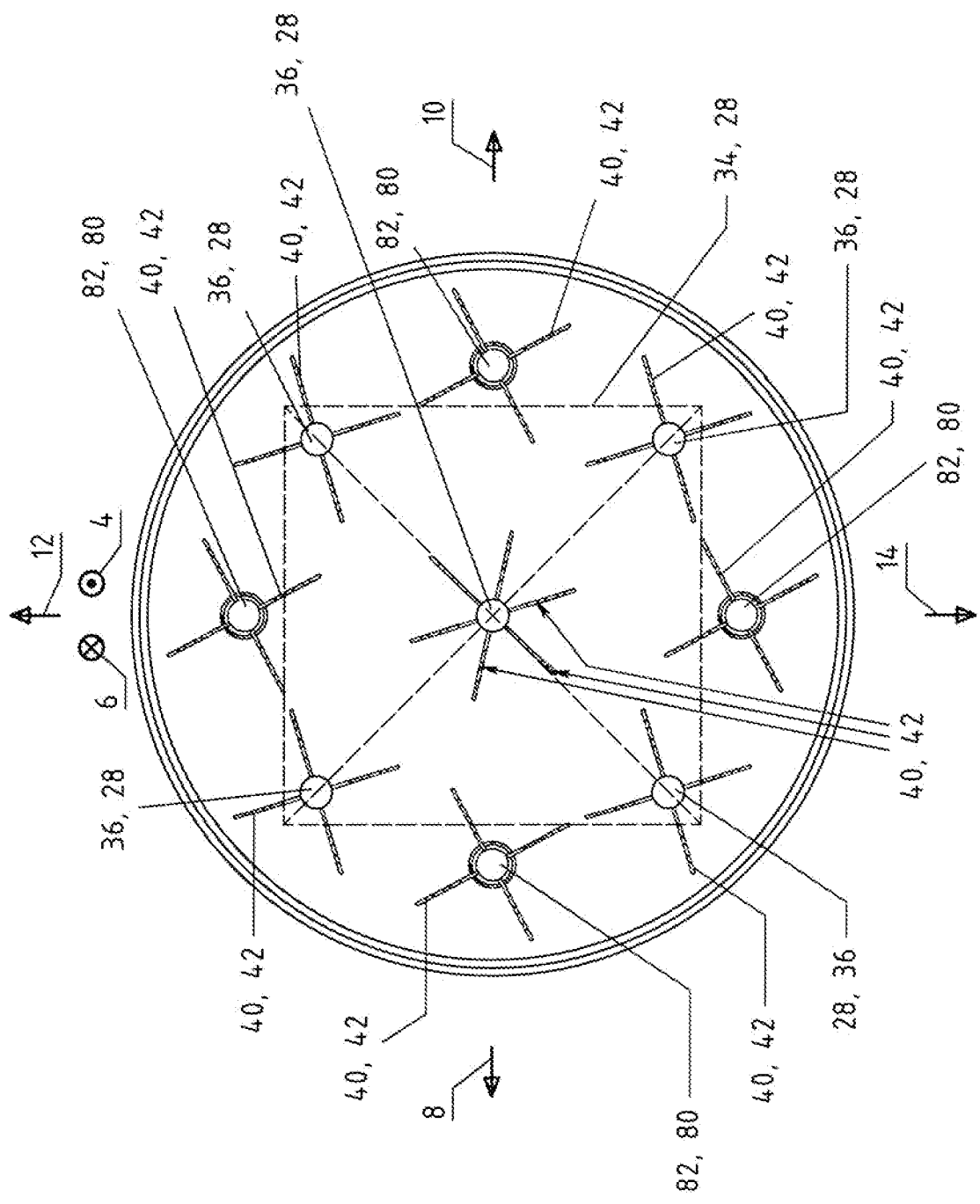

As can be seen in FIG. 3, a total of five struts 36 are provided, of which one center strut 36 extends along the height axis 16, while the remaining four struts 36 are disposed symmetrically about the height axis 16. In order to ensure the greatest possible surface area contact between the first solid body arrangement 28 and the heat storage medium within the storage space 20, ribs or fins 40 are disposed on the struts 36 and are preferably implemented by a multiply curved, elongated element 42, optionally in one plane. In the FIGS. 1 and 2, however, only some of the actually provided ribs or fins 40 are shown in order to increase clarity, while the actual quantity can be substantially seen in FIGS. 3 and 4.

The outlet-side solid body 34 comprises a surface 44 on the side thereof facing away from the struts 36 and substantially facing in the height direction 4, said surface serving for establishing solid body contact between the first and second solid body arrangements 28, as described in more detail below. As is evident particularly from FIG. 2, the surface 44 of the outlet-side solid body 34 is shaped in the manner of a lateral surface of a pyramid, optionally of a frustrum of a pyramid, wherein the height axis of the pyramid extends substantially in the height directions 4, 6, here along the height axis 16. In the embodiment shown, the pyramid has a total of four lateral surfaces, so that the surface 44 is divided into four first surface segments 46 through 52.

The second solid body arrangement 30 is substantially implemented by a solid body 54 extending in the height direction 4 above the outlet-side solid body 34 of the first solid body arrangement 28 and spaced apart from the same, and extends substantially in the width and length direction 8 through 14 in order to be disposed flush with the outlet side solid body 34 of the first solid body arrangement 28 in the height direction 4, 6. On the side thereof facing toward the outlet-side solid body 34 in the height direction 6, the outlet-side solid body 54 in turn comprises a surface 56 by means of which the solid body contact with the first solid body arrangement 28 is to be established as described below in greater detail. The solid body 54 can thus also be referred to as an inlet-side solid body. The surface 56 of the second solid body arrangement 30 is also shaped in the manner of the lateral surface of a pyramid, optionally of a frustrum of a pyramid, wherein the pyramid or frustrum of a pyramid in the present case also comprises four sides, so that the surface 56 is analogously divided into four second surface segments 58 to 64.

The solid body 34 of the first solid body arrangement 28 and the outlet-side solid body 54 of the second solid body arrangement 30 are disposed fixed and non-displaceable relative to each other, such that the first surface segment 46 and the second surface segment 58, the first surface segment 48 and the second surface segment the first surface segment 50 and the second surface segment 62, and the first surface segment 52 and the second surface segment 64 are opposite each other in the height direction 4, 6, and are thus associated with each other and furthermore inclined relative to each other, wherein the first and second surface segments associated with each other each preferably enclose an angle α of less than 60° or less than 10°.

On the side of the solid body 54 of the second solid body arrangement 30 facing away from the first solid body arrangement 28, said solid body has a side implementing an inner side 66 of a fluid container not shown in further detail, or a fluid line not shown in further detail, for heating a fluid, so that the heat extracted from the heat storage medium within the storage space 20 by means of the extraction device 26 can be dissipated to the fluid of a consumer at the inner side 66. The solid body 54 can therefore also be referred to as the outlet-side solid body 54. The inner side 66 is preferably the inner side 66 of the boiler of an evaporator for evaporating the fluid or for heating and optionally feeding the fluid to a turbine driven by the vapor.

The solid bodies 34, 54 of the first and second solid body arrangements 28, 30, particularly the surfaces 44, 56 thereof, are disposed in a contact space 68 implemented above the storage space 20 and within the housing 18. The contact space 68 is bounded in the height direction 4 and in the width and length direction 8 through 14 by an upper housing part 70 of the housing 18 and in the height direction 6 substantially by the outer housing part 24, optionally also by the inner housing part 22, wherein the contact space 68 is closed off, so that said space is not integrated in an air or fluid circuit or the like. The contact space 68 is further evacuated in order to prevent heat loss at the outlet-side solid body 34 of the first solid body arrangement 28 due to convention at the surface 44.

In order to be able to modify a heat flow from the first solid body arrangement 28, that is, starting from the heat storage medium within the storage space 20 via the struts 36 and the outlet-side solid body 24, to the second solid body arrangement 30, that is, to the solid body 54 and finally to the inner side 66, a solid body contact between the first solid body arrangement 28 and the second solid body arrangement 30 can be modified by increasing or decreasing said heat flow from the first solid body arrangement 28 to the second solid body arrangement 30. In the concrete embodiment according to FIG. 1 through 6, the solid body contact between the first solid body arrangement 28 and the second solid body arrangement 30 can be modified incrementally or stepwise, namely by modifying a quantity of solid bodies contacting both the first and the second solid body arrangement 28, 30, as is explained below in greater detail. The solid body contact between the first solid body arrangement 28 and the second solid body arrangement 30 can also be eliminated and established by the extraction device 26, wherein the solid body contact can be or is established indirectly by means of the third solid body arrangement 32 described below.

As previously indicated, for the embodiment of the heat storage system 2 shown, a third solid body arrangement 32 is provided for modifying a solid body contact between the first solid body arrangement 28 and the second solid body arrangement 30 in an incremental or stepwise manner by increasing or decreasing a heat flow from the first solid body arrangement 28 to the second solid body arrangement 30. The third solid body arrangement 32 comprises a plurality of displaceable solid bodies, wherein four solid bodies 72 to 78 are provided in the embodiment shown. The third solid body arrangement 32 or at least the displaceable solid bodies thereof 72 to 78 are thereby disposed within the previously described contact space 68. While the first solid body arrangement 28 and the second solid body arrangement 30, particularly the solid bodies thereof 34 and 54, are disposed fixed relative to each other on the housing 18 and the surfaces thereof 44 and 56 are permanent spaced apart from each other, the displaceable solid bodies 72 through 78 are displaceable relative to the first and second solid body arrangement 28, 30, particularly relative to the two solid bodies 34 and 54. More precisely, the displaceable solid bodies 72 through 78 are displaceable transverse to the height axis 16 relative to the solid bodies 34, 54 and thereby translationally displaceable or slideable, wherein a drive device, not shown in further detail, for displacing the displaceable solid bodies 72 through 78 is associated with the same. The drive device preferably comprises an electric motor or hydraulic drive. The displaceable solid bodies 72 through 78 are also each wedge-shaped or wedge-like in design, so that said bodies have a surface facing downward in the height direction 6 and a surface facing upward in the height direction 4 inclined relative to each other due to the wedge shape, wherein the angle of inclination preferably corresponds to the previously described angle α between the first and second surface segments 46 through 52 and 58 through 64 associated with each other.

Figure 5:
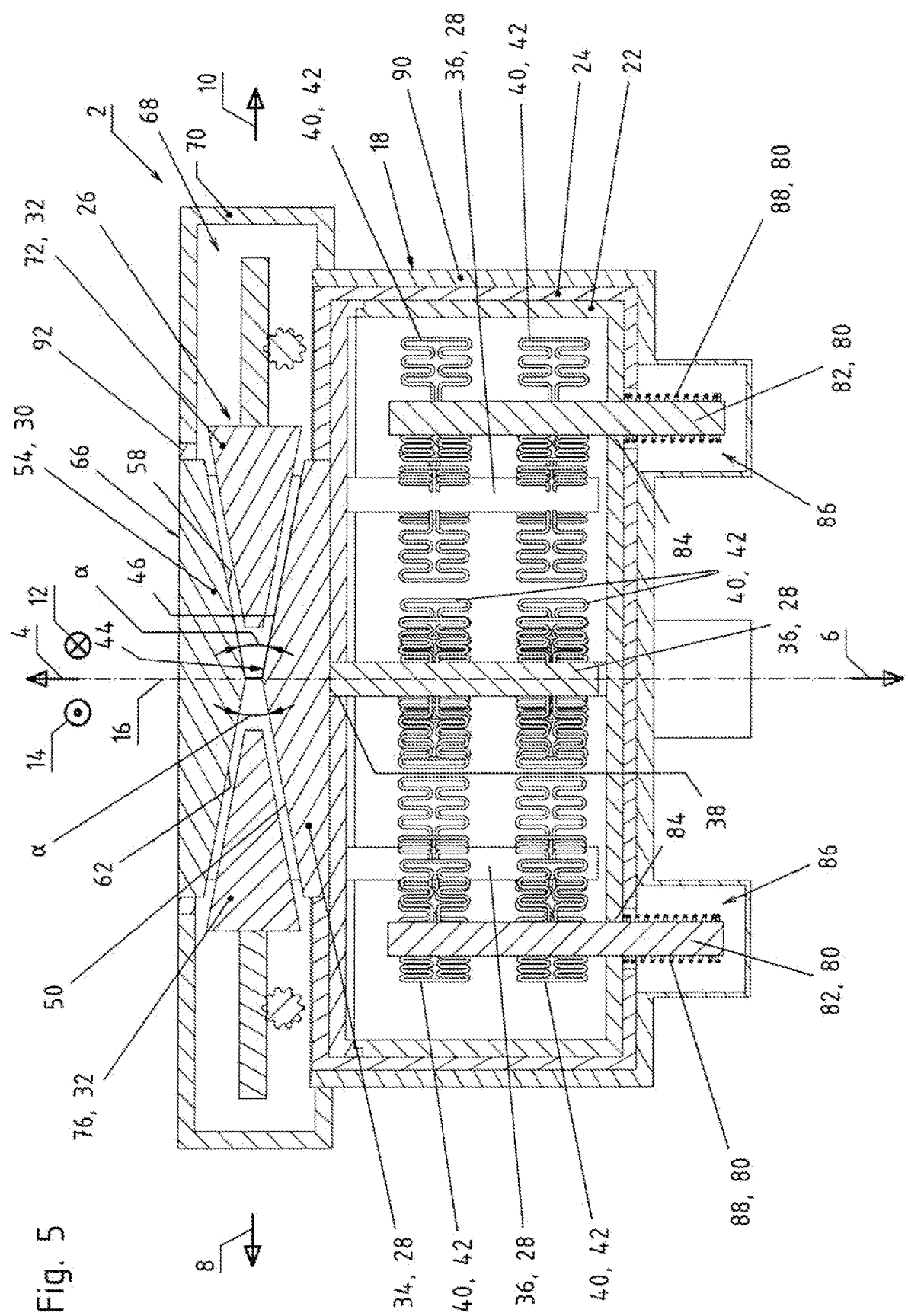
Figure 6:
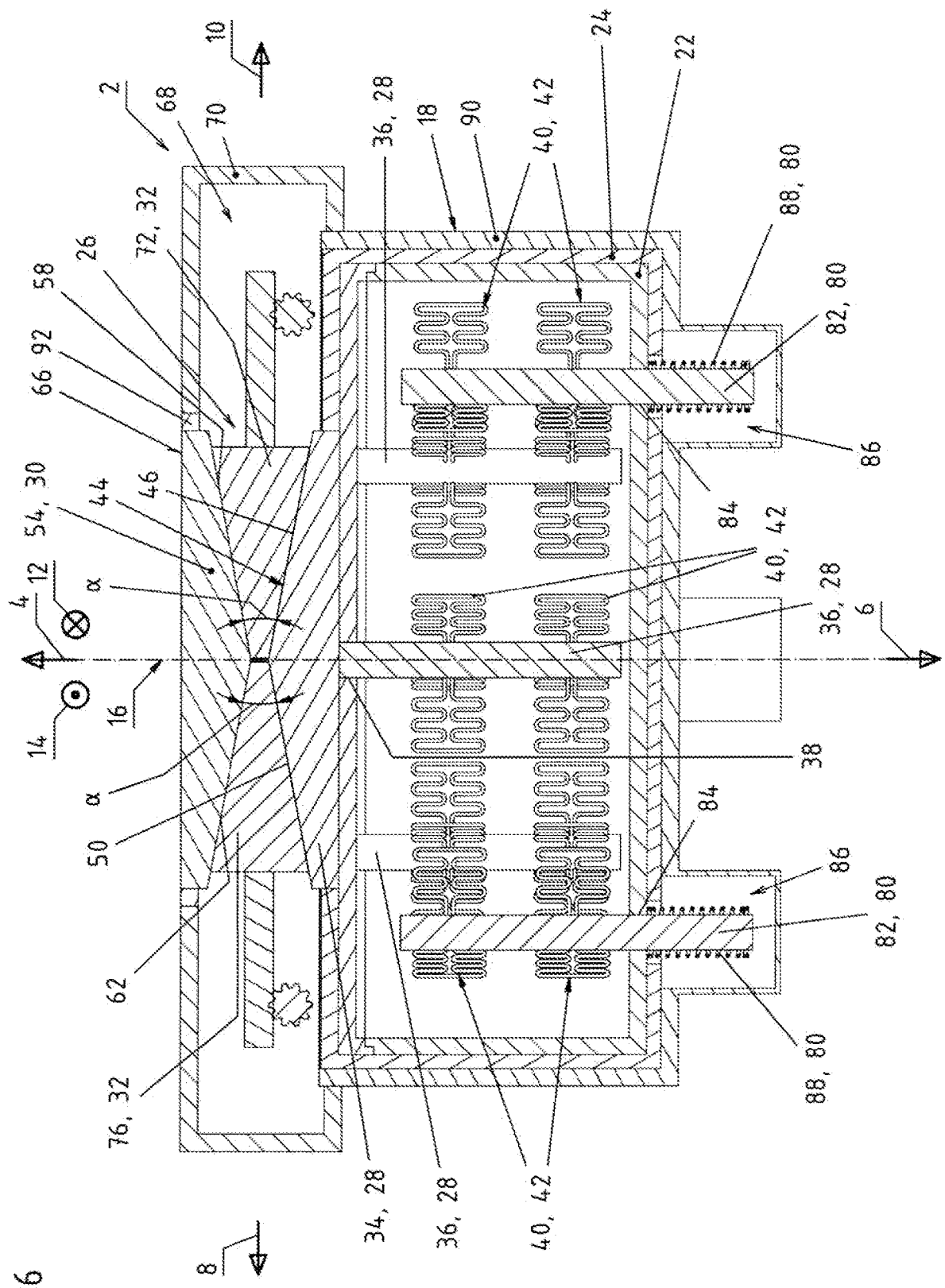

Thus the displaceable solid body 72 can be displaced in the width direction 8, starting from the first position thereof shown in FIGS. 1 and 5, wherein the displaceable solid body 72 does not contact any of the surface segments 46 and 58 of the surfaces 44 and 56, or contacts only one of the surface segments 46 or 58, into the second position shown in FIG. 6, wherein the displaceable solid body 72 flatly contacts both surface segments 46 and 58 of the surfaces 44 and 56 of the first and second solid body arrangement 28, 30, so that the indirect solid body contact between the first solid body arrangement 28 and the second solid body arrangement 30 by means of the displaceable solid body 72 has been modified in one step or one increment while increasing the heat flow from the first solid body arrangement 28 to the second solid body arrangement 30. The further displaceable solid bodies 74, 76, and 78 can be displaced into the first or/and second position independently of the displaceable solid body 72 and independently of each other, wherein the displaceable solid body 74 can be displaced or translationally displaced or slid in the longitudinal direction 12 from the first position into the second position, the displaceable solid body 76 can be displaced or translationally displaced or slid in the width direction from the first position into the second position, and the displaceable solid body 78 can be displaced or translationally displaced or slid in the longitudinal direction 14 from the first position into the second position. The more the displaceable solid bodies 72 through 78 are disposed in the second position, the greater the potential heat flow between the first solid body arrangement 28 and the second solid body arrangement wherein the modifying of the indirect solid body contact and therefore also the modifying of the heat flow can be done incrementally or stepwise as a function of the quantity of the displaceable solid bodies 72 through 78 disposed in the second position.

Although the embodiment shown in the figures, wherein the solid body contact is or can be established indirectly by means of the third solid body arrangement 32, is considered to be particularly advantageous, it is further noted that embodiments deviating therefrom can also be advantageous. It is noted, for example, that the heat storage system 2 can also be implemented such that the solid body contact between the first solid body arrangement 28 and the second solid body arrangement 30 can be modified continuously. The solid body contact between the first solid body arrangement 28 and the second solid body arrangement 30 could also be established directly, in that, for example, the solid bodies 34 and 54 are displaceable relative to each other for establishing or modifying a solid body contact. In this case, a displaceable solid body 54 of the second solid body arrangement 30 would be preferred, while the first solid body arrangement 28 retains the relative position thereof with respect to the storage space 20. In this case as well, the surfaces 44 and 56 facing each other must or should be adapted to the present special embodiment. Thus a corresponding displacement of the solid bodies 34 and 54 relative to each other can modify the solid body contact by modifying the size of a contact surface between the first solid body arrangement 28 and the second solid body arrangement 30.

In order to be able to introduce the heat to be stored into the heat storage system 2, the heat storage system 2 further comprises a heating device 80 for heating the heat storage medium within the storage space 20, wherein the heating device 80 is an inductive heating device 80. The heating device 80 thus particularly comprises a plurality of inductively heated heating struts 82 extending into the storage space 20 and extending substantially in the height directions 4, 6. In concrete terms, the heating struts 82 extend in the height direction 4 into the storage space 20 on one side through an opening 84 at the floor of the housing parts 22, 24, without the ends thereof facing upward in the height direction 4 adjoining the inner housing part 22; rather, the ends of the heating struts 82 are spaced apart from the inner housing part 22, so that the ends can also be referred to as free ends. In the opposite height direction 6, the heating struts 82 extend through said opening 84 into an induction space 86, wherein said induction space is a closed or/and evacuated space in which not only the heating strut 82 but also the inductor 8 associated with the heating strut 82, for example an electrical coil, is disposed for heating the heating strut 82 by means of a high-frequency alternating current.

Figure 4:
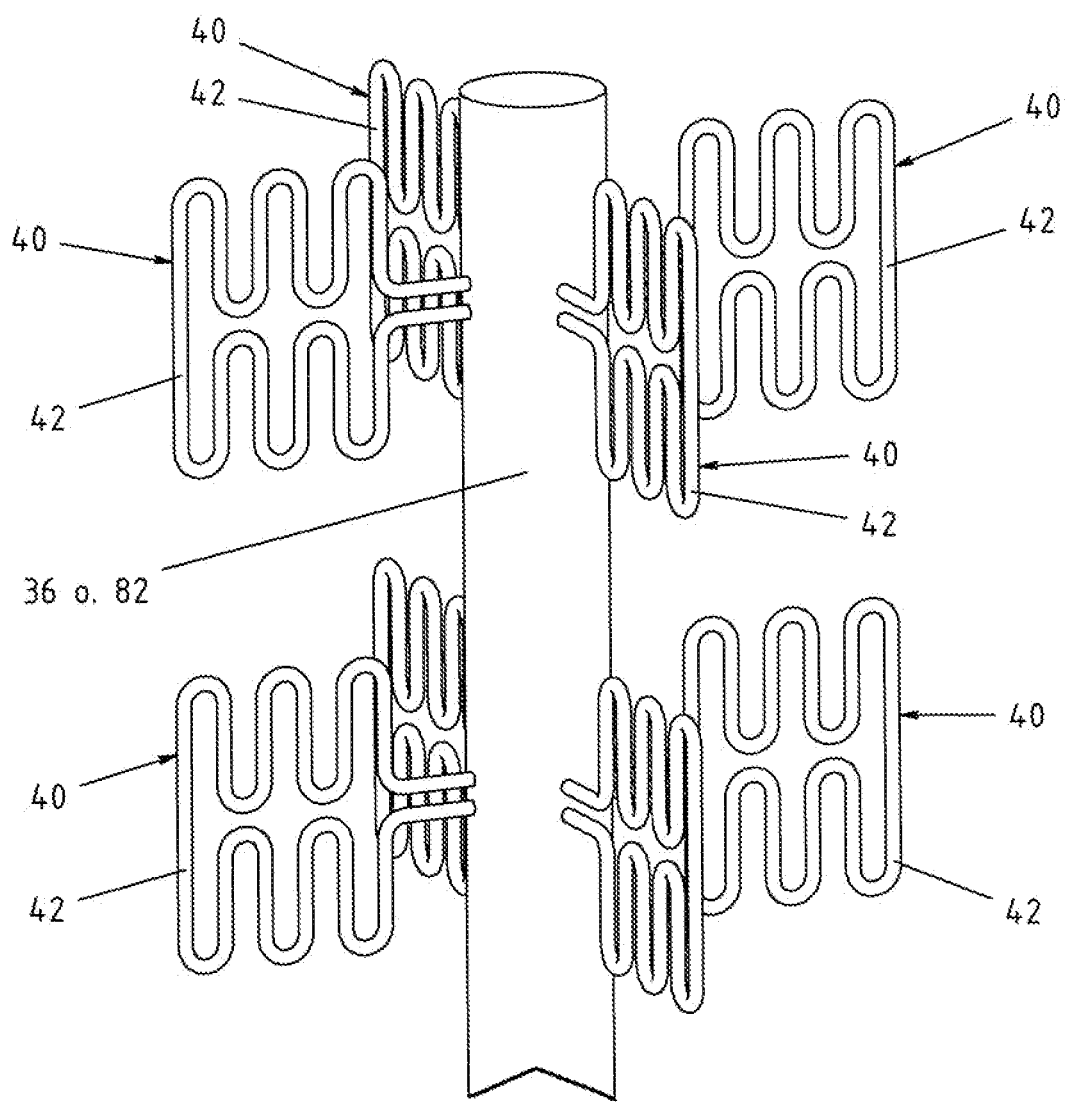

In order to achieve the greatest possible contact surface area between the heating device 80 and the heat storage medium within the storage space 20, the ribs or fins 40 previously described with reference to the struts 36 of the first solid body arrangement 28 are provided on the heating struts 82 as well, and are disposed on the heating struts 82 and implemented by a multiply curved, elongated element 42, so that in this respect the depiction in FIG. 4 applies equally to the struts 36 and the heating struts 82.

The closed or/and evacuated induction spaces 86 are substantially bounded by a lower housing part 90 of the housing 18 and in the height direction 4 by the inner or/and outer housing part 22, 24. Together with the top housing part 70, the bottom housing part 90 in which the inner housing part 22 and the outer housing part 24 are received forms the outer shell of the heat storage system 2.

As previously described, the first solid body arrangement 28, the second solid body arrangement 30, and the third solid body arrangement 32 are implemented by one or more solid bodies, wherein said solid bodies are preferably made of a metal or a metal alloy in order to ensure high thermal conductivity on the part of said solid body arrangements 28, 30, 32. Thus particularly the outlet-side solid body 34, the struts 36, and the ribs or fins of the first solid body arrangement 28, the solid body 54 of the second solid body arrangement 30, and the displaceable solid bodies 72, 74, 76, 78 of the third solid body arrangement 32 are made of a metal or a metal alloy in the embodiment shown, wherein the same applies correspondingly to the heating struts 82 and the ribs or fins 40 disposed thereon. Particularly for the struts 36 or/and the heating struts 82, manufacturing from steel is possible, so that both good thermal conductivity and chemical resistance to the heat storage medium within the storage space 20 are provided. For the displaceable solid bodies 72, 74, 76, 78, a nonferrous metal, preferably copper or a copper alloy, is proposed as a material, whereas the solid bodies 34 or/and 54 could be made of steel or also of a nonferrous metal such as copper or a copper alloy.

While the metal solid bodies of the solid body arrangements 28, 30, 32 have particularly high thermal conductivity, at least the outer housing part 24 in which the inner housing part 22 having the storage space 20 is received, comprises a material having a significantly lower thermal conductivity than the material of said solid body arrangements 28, 30, 32. The same can apply fundamentally to the inner housing part 22 directly facing the storage space 20, but the inner housing part 22 can also be designed primarily such that a certain resistance of the housing relative to the heat storage medium within the storage space 20 is achieved, so that the inner housing part 22 can also fundamentally be made of steel.

From the depiction in FIGS. 1, 5, and 6 it is evident that in addition to the modifiable solid body contact between the first solid body arrangement 28 and the second solid body arrangement 30 by means of the third solid body arrangement 32 as described above, a permanent solid body contact between the first and second solid body arrangements 28, 30 also is present by means of at least one further component of the heat storage system 2, here by means of the housing 18. In concrete terms, the outlet-side solid body 34 of the first solid body arrangement 28 indirectly makes solid body contact with the outlet-side solid body 54 of the second solid body arrangement 30 by means of the outer housing part 24, the bottom housing part 90, and the top housing part 70, wherein the solid body contact is permanent. Because the outer housing part 24, optionally also the bottom housing part 90 or/and the top housing part 70, has a lower thermal conductivity than the two solid bodies 34, 54 of the first and second solid body arrangement 28, 30, or are even implemented as insulators, said permanent solid body contact is not further significant in terms of any heat loss. The solid body 54 of the second solid body arrangement 30 is further supported or disposed on the top housing part 70 by means of an insulated component again having a lower thermal conductivity relative to the top housing part 70.

It must be noted in conclusion that the heat storage system 2 is preferably implemented as a latent heat storage system having what is known as a phase change material as the heat storage medium. The heat storage medium is preferably a salt or a salt mixture, wherein the heat output to the first solid body arrangement 28 preferably takes place by means of a transition of a liquid state into a solid state of the salt or salt mixture, for which reason a molten salt storage system can also be referred to here.

REFERENCE LIST

2 Heat storage system
4 Height direction
6 Height direction
8 Width direction
10 Width direction
12 Length direction
14 Length direction
16 Height axis
18 Housing
20 Storage space
22 Inner housing part
24 Outer housing part
26 Extraction device
28 First solid body arrangement
30 Second solid body arrangement
32 Third solid body arrangement
34 Solid body
36 Struts
38 Openings
40 Ribs/fins
42 Element
44 Surface
46 First surface segment
48 First surface segment
50 First surface segment
52 First surface segment
54 Solid body
56 Surface
58 Second surface segment
60 Second surface segment
62 Second surface segment
64 Second surface segment
66 Inner side
68 Contact space
70 Top housing part
72 Displaceable solid body
74 Displaceable solid body
76 Displaceable solid body
78 Displaceable solid body
80 Heating device
82 Heating struts
84 Opening
86 Induction space
88 Inductor
90 Bottom housing part
92 Component
α Angle

The invention claimed is:

1. A heat storage system comprising:
a storage space,
a heat storage medium in the storage space,
a heating device for heating the heat storage medium, and
an extraction device for extracting heat from the heat storage medium, the extraction device comprising a first solid body arrangement contacting the heat storage medium, wherein the extraction device further comprises a second solid body arrangement,
wherein a solid body contact between the first solid body arrangement and the second solid body arrangement can be modified thereby increasing or decreasing a heat flow from the first solid body arrangement to the second solid body arrangement, and wherein the solid body contact between the first solid body arrangement and the second solid body arrangement can be eliminated and is or can be established indirectly.

2. The heat storage system according to claim 1, wherein the solid body contact between the first solid body arrangement and the second solid body arrangement can be modified incrementally or continuously, or/and can be modified by modifying a quantity of solid bodies contacting the first and the second solid body arrangements.

3. The heat storage system according to claim 1, wherein the first solid body arrangement and the second solid body arrangement each comprise at least one surface by means of which the solid body contact is or can be established indirectly, wherein the surfaces are preferably disposed in a closed or/and evacuated contact space.

4. The heat storage system according to claim 3, wherein a third solid body arrangement having at least one displaceable solid body is provided and can be displaced or translationally shifted relative to the first and second solid body arrangements from a first position in which the displaceable solid body does not contact any of the surfaces or contacts the surface of only one of the first and second solid body arrangements into a second position in which the displaceable solid body contacts the surfaces of the first and second solid body arrangement, wherein the third solid body arrangement preferably comprises at least two displaceable solid bodies displaceable independently of each other into the first or/and second position, or/and the at least one displaceable solid body is preferably disposed in the closed or/and evacuated contact space, and the first and second solid body arrangements are particularly preferably disposed fixed relative to each other or/and the surfaces thereof are permanently spaced apart from each other.

5. The heat storage system according to claim 4, wherein the surface of the first solid body arrangement comprises at least one first surface segment and the surface of the second solid body arrangement comprises at least one second surface segment associated with each other and inclined relative to each other, and the displaceable solid body of the third solid body arrangement is implemented having a wedge shape, such that said body makes flat contact with the first and second surface segments of the first and second solid body arrangements in the second position, wherein the surface segments associated with each other preferably enclose an angle ($\alpha$) of less than 60° or less than 10°, and the surface of the first or/and second solid body arrangement is particularly preferably shaped in the manner of a lateral surface of a pyramid or a frustrum of a pyramid.

6. The heat storage system according to claim 1, wherein the first solid body arrangement comprises an outlet-side solid body for establishing solid body contact with the second solid body arrangement and comprises at least one strut protruding into the storage space for contacting the storage medium, wherein protruding ribs or fins are preferably disposed on the strut and implemented particularly preferably by a multiply curved, elongated element, optionally in one plane, or/and the second solid body arrangement comprises a solid body for implementing the inner side of a fluid container, preferably for implementing the inner side of the boiler of an evaporator, or comprises a fluid line for heating a fluid.

7. The heat storage system according to claim 1, wherein the heating device is an inductive heating device wherein the heating device comprises at least one heatable heating strut extending into the storage space and particularly preferably extending out of the storage space into a closed or/and evacuated induction space in which the heating strut interacts with an inductor.

8. The heat storage system according to claim 1, wherein the heat storage system is implemented as a latent heat storage system having a phase change material as the heat storage medium, wherein the heat storage medium is preferably a salt or a salt mixture, or/and the first solid body arrangement or/and the second solid body arrangement is implemented by one or more solid bodies made of metal, or/and in addition to the modifiable solid body contact, a permanent solid body contact is present between the first and second solid body arrangements by means of at least one further component of the heat storage system preferably implemented as an insulator or/and having a lower thermal conductivity than the at least one solid body of the first and second solid body arrangements.

9. The heat storage system according to claim 4, wherein the third solid body arrangement is implemented by one or more solid bodies made of metal.

10. A method for storing and extracting heat for operating a heat storage system according to claim 1, having the method steps comprising:
providing a heat storage medium contacting a first solid body arrangement,
providing a heating device for heating the heat storage medium and a second solid body arrangement,
heating the heat storage medium by said heating device,
modifying a solid body contact between the first solid body arrangement and the second solid body arrangement thereby increasing or decreasing a heat flow from the first solid body arrangement to the second solid body arrangement, and
extracting heat at the second solid body arrangement.

11. The method according to claim 10, wherein the solid body contact between the first solid body arrangement and the second solid body arrangement can be modified incrementally or continuously, or/and can be modified by modifying a quantity of solid bodies contacting the first and the second solid body arrangements, or/and heat is extracted at the second solid body arrangement by heating a fluid contacting the second solid body arrangement.

* * * * *